United States Patent
Hill et al.

(10) Patent No.: US 8,205,111 B2
(45) Date of Patent: Jun. 19, 2012

(54) COMMUNICATING VIA AN IN-DIE INTERCONNECT

(75) Inventors: David L. Hill, Cornelius, OR (US);
Robert J. Greiner, Beaverton, OR (US);
Tim Frodsham, Beaverton, OR (US);
Derek Bachand, Portland, OR (US);
Anant Deval, Beaverton, OR (US);
Mark Waggoner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 12/348,054

(22) Filed: Jan. 2, 2009

(65) Prior Publication Data

US 2010/0174936 A1    Jul. 8, 2010

(51) Int. Cl.
*G06F 1/04* (2006.01)
*G06F 1/12* (2006.01)
*G06F 5/06* (2006.01)
*H04L 7/00* (2006.01)

(52) U.S. Cl. ......... 713/601; 713/400; 713/500; 713/600
(58) Field of Classification Search .................... 713/400, 713/500, 501, 502, 503, 600, 601
See application file for complete search history.

(56) References Cited

U.S. PATENT DOCUMENTS

| 5,574,849 | A | * | 11/1996 | Sonnier et al. | 714/12 |
| 5,751,955 | A | * | 5/1998 | Sonnier et al. | 714/12 |
| 6,009,488 | A | | 12/1999 | Kavipurapu | |
| 6,678,756 | B1 | * | 1/2004 | Tseng et al. | 710/52 |
| 6,687,255 | B1 | * | 2/2004 | Holm et al. | 370/412 |
| 6,711,227 | B1 | * | 3/2004 | Kaylani et al. | 375/372 |
| 6,711,696 | B1 | * | 3/2004 | Bates et al. | 713/600 |
| 7,107,393 | B1 | * | 9/2006 | Sabih | 711/109 |
| 7,296,174 | B2 | * | 11/2007 | Kelly | 713/500 |
| 7,310,396 | B1 | * | 12/2007 | Sabih | 375/354 |
| 2003/0188213 | A1 | * | 10/2003 | Kark et al. | 713/400 |
| 2007/0073977 | A1 | | 3/2007 | Safranek, Jr. et al. | |

* cited by examiner

*Primary Examiner* — Mark Connolly
(74) *Attorney, Agent, or Firm* — Trop, Pruner & Hu, P.C.

(57) ABSTRACT

In one embodiment, the present invention includes a method for writing data from a writer coupled to a reader via an in-die interconnect into a queue entry according to a first clock of the writer, generating a mapping of which second clocks of the reader that the reader is allowed to read from the queue, based at least in part on the first and second clocks, and reading the data from the entry at an allowed second clock. Other embodiments are described and claimed.

18 Claims, 7 Drawing Sheets

COMMUNICATING VIA AN IN-DIE INTERCONNECT

BACKGROUND

In modern semiconductor technology, great amounts of functionality are provided within a single chip, which is often implemented on a single semiconductor die. For example, multi-core processors have been developed that include multiple processing cores formed on a single semiconductor die. It is further anticipated that greater amounts of functionality in the form of disparate intellectual property (IP) logic blocks will continue to be integrated on a single semiconductor die.

One complexity that exists with regard to incorporating different functional logic blocks is that these different logic blocks can operate in different voltage and frequency domains. As such, communication between these logic blocks becomes complex and can require significant clock skew and voltage domain crossing logic, which can consume excessive latency, die size and power.

DETAILED DESCRIPTION

Figure 1:
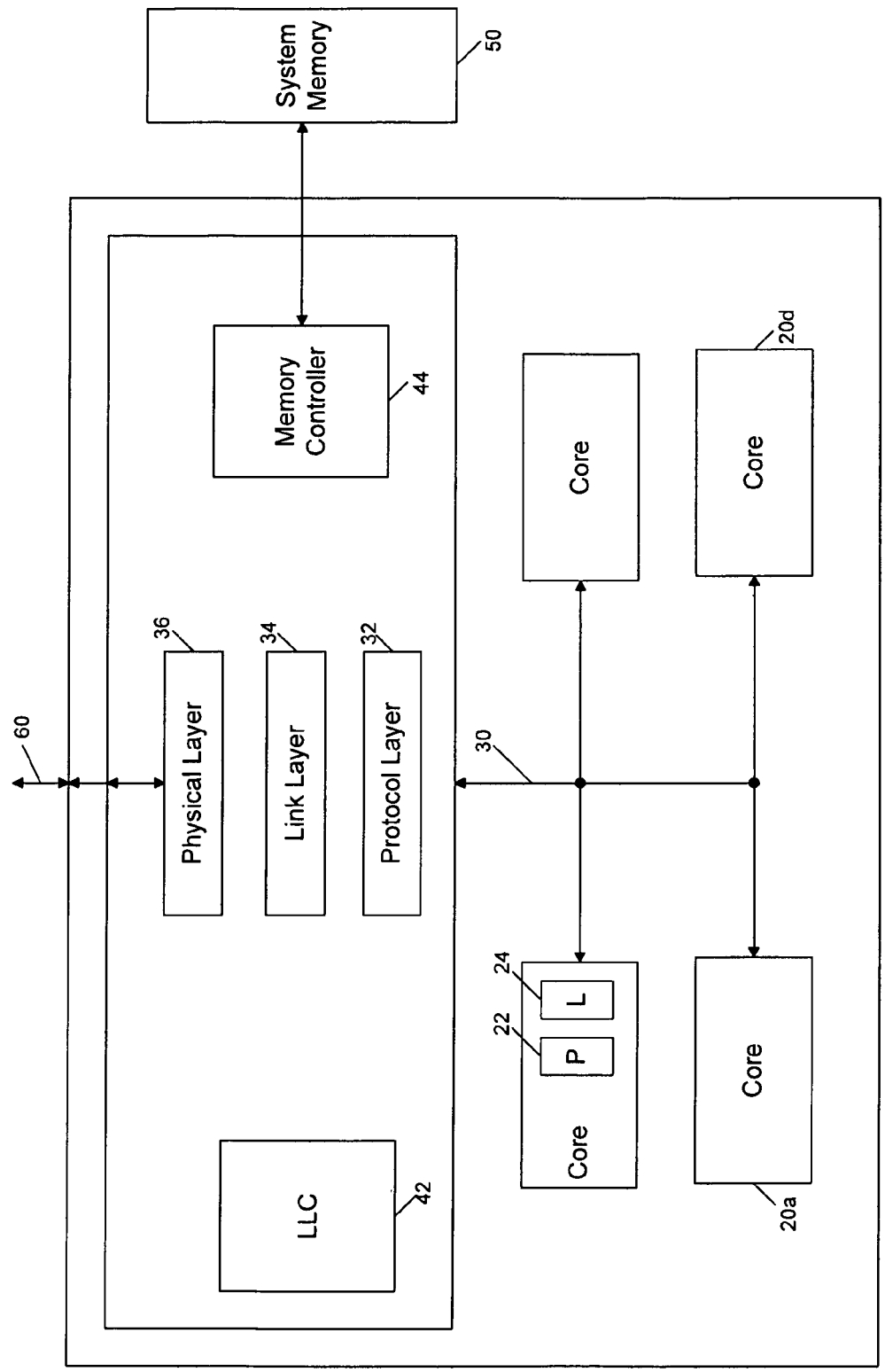
FIG. 1 is a block diagram of a processor in accordance with an embodiment of the present invention.

In various embodiments, an internal or in-die interconnect (IDI) may be provided to enable communication between various IP logic blocks located on a single semiconductor die of a semiconductor device. The IDI may be configured to enable such communication even where the different logic blocks operate at different voltage and frequency domains. As will be described further below, various mechanisms may enable communication between disparate domains. More particularly, the IDI may couple one or more logic blocks to a system interface of the semiconductor device. In turn, this system interface may communicate with various off-chip entities, such as a system memory (e.g., dynamic random access memory (DRAM)), input/output devices or the like. As examples of IP logic blocks, embodiments may include one or more processing cores, graphics or media processing units (GPUs, MPUs), fixed function units such as a physics processing unit or other such blocks.

Communication along the IDI may be according to a given communication protocol such as a cache coherent communication protocol. Such a protocol may enable cache coherent communication between the various logic blocks and an on-die shared cache, such as a last level cache (LLC) coupled to the IDI. In some implementations, the IDI may include various communication layers such as a protocol layer, which is a highest layer of an interconnection hierarchy and sets a format for message transmission, and a link layer, which receives transmission packets from the protocol layer and handles communication using flow control, encoding and error checking techniques, as will be described further below. There may also be multiple virtual or physical channels as needed for deadlock free protocols. Note that the link layer may be skew tolerant of differences in the frequency or voltage at which the different components operate.

To enable communication amongst different on-chip entities having different clock and voltage domains, mechanisms may be provided within the IDI to enable voltage and clock crossing activity. The communication across the IDI may take various forms, and may include different message types. In some implementations, each message type may be associated with a given communication channel. Still further, one or more physical or virtual channels may be combined into a tunnel for communication along the IDI.

For purposes of discussion, various terminology used herein is described further. A transaction may include a request, its associated response, and possibly data, e.g., a read transaction from a logic block includes the read request, a response and data. A snoop transaction from the system interface includes the snoop request, the response from the logic block, and if needed, the data from the logic block.

A message is a protocol layer term describing information in the form of some number of bit fields to be sent from a sender to a receiver. Depending on implementation, the link layer or physical layer may break this message into widths needed to accomplish the actual transport. For example a data message in IDI may be of 64 byte width, and the protocol layer data flow control is done on 64 byte messages. The link and physical layer may transport a 64 byte data message in one clock with 512 wires, in four clocks with 128 wires, or in two clocks with 256 wires. In one embodiment, link layer logic may use 16 byte flow control on IDI datapaths. Similarly, requests, responses etc have message sizes which may be full, half, quarter width, etc at the link layer. The terms FLIT and PHIT to refer respectively to link and physical layer breakouts of a protocol layer message. FLIT means FLow-control unITs, and PHIT means PHysical layer unITs (of transport). In some IDI implementations, FLITS and PHITS may be the same size, but they need not be.

In turn, a channel is a protocol layer logical grouping of fields/wires that carries messages of a given message type. In one embodiment, an IDI interface has four channels coupled in each direction between processing logic such as a core and the system interface. In such an embodiment, the four different channels are request, response, credit and data. By having four independent channels, different kinds of messages may use dedicated wires and achieve both decoupling and a higher effective throughput per wire. Each channel operates independently of the other channels from a logical standpoint, but in some implementations multiple channels may be linked together in a tunnel. Thus a tunnel is a collection of channels that are linked together in order to jump together as a group through the voltage and frequency domain from sender to receiver. Information that is sent in linked channels will be observed in the receiver together on the same receiver clock cycle, and in the same order as the sender sent it. In various embodiments, an IDI tunnel may include a plurality of channels. For example, in one embodiment the IDI may have a command tunnel and a data tunnel, where at least the command tunnel is formed of multiple channels linked together. For example, the command tunnel can be made up of request, response, and credit channels.

Domain crossing logic may be present in the IDI to handle voltage and clock differences between agents coupled to the IDI. As an example, a circuit referred to as a bubble generator first-in-first-out (FIFO) (BGF) handles the conversion from logic block clock ratio and voltage to system interface clock ratio and voltage and vice versa. From the IDI perspective, such FIFOS are link layer structures that transport protocol layer messages, and each BGF writer locally tracks the available BGF credits needed to gain use of the structure entries, as will be described further below. In one embodiment, each tunnel has a BGF, and any write to any channel within a tunnel will consume a BGF credit.

Note that to handle crossing voltage levels, voltage-level shifters can be used. In various embodiments, an IDI skew-tolerance mechanism deals with clock skew and jitter, which is a function of disparate voltage domains, differing PLL domains, and allows the ratioing mechanics on which power-saving or performance features are based. For example, with two voltage domains, the power supplies may droop or overshoot at different points in time, which creates timing variation across the two domains, called power-supply induced clock jitter. The IDI BGF's rollup all this skew and jitter from multiple sources (PLL's, non-tracking power supplies, supply droop, differing clock ratios, etc) into one combined "slip" budget between the domains. The "slip" is the programmable number of clocks of pointer separation in the BGF's. This gives IDI its low-latency "all in one" skew tolerance that allows easy connectivity across voltage and clock domains.

Referring now to FIG. 1, shown is a block diagram of a semiconductor device, namely a processor 10 in accordance with an embodiment of the present invention. As shown in FIG. 1, processor 10 may include a plurality of logic blocks $20_a$-$20_d$ (generically logic block 20). As shown in FIG. 1, each of the logic blocks may be a processor core, although the scope of the present invention is not limited in this regard. For example, in other implementations some of the logic blocks may be other types of processing units.

In addition, processor 10 includes a system interface 40 that includes various components for communication with other system components such as memory, chipset components, peripheral devices and so forth. System interface 40 includes a cache memory 42 which may be a shared last level cache and a memory controller 44 to enable communication with a system memory 50 coupled to processor 10. In the embodiment shown in FIG. 1, to communicate between cores 20 and system interface 40 an IDI 30 is provided. To enable communications with IDI 30, cores 20 and system interface 40 may include various logic to handle domain crossing issues, as each of the cores and system interface may be operating in different voltage/clock domains. For ease of illustration, core $20_a$ is shown as including a protocol layer 22 and a link layer 24 to provide communication between core 20 and system interface 40 via IDI 30. In turn, system interface 40 includes similar protocol and link layers 32 and 34, respectively. Still further, system interface 40 may include a physical layer 36 coupled to link layer 34 to enable communications to/from processor 10 with off chip entities coupled to an off-chip interconnect 60. Note that this block diagram does not show the physical reality of independent voltages, ratios, phase lock loops (PLLs), using independent physical connections between each core and system interface. While shown with this particular implementation in the embodiment of FIG. 1, the scope of the present invention is not limited in this regard.

Figure 2A:
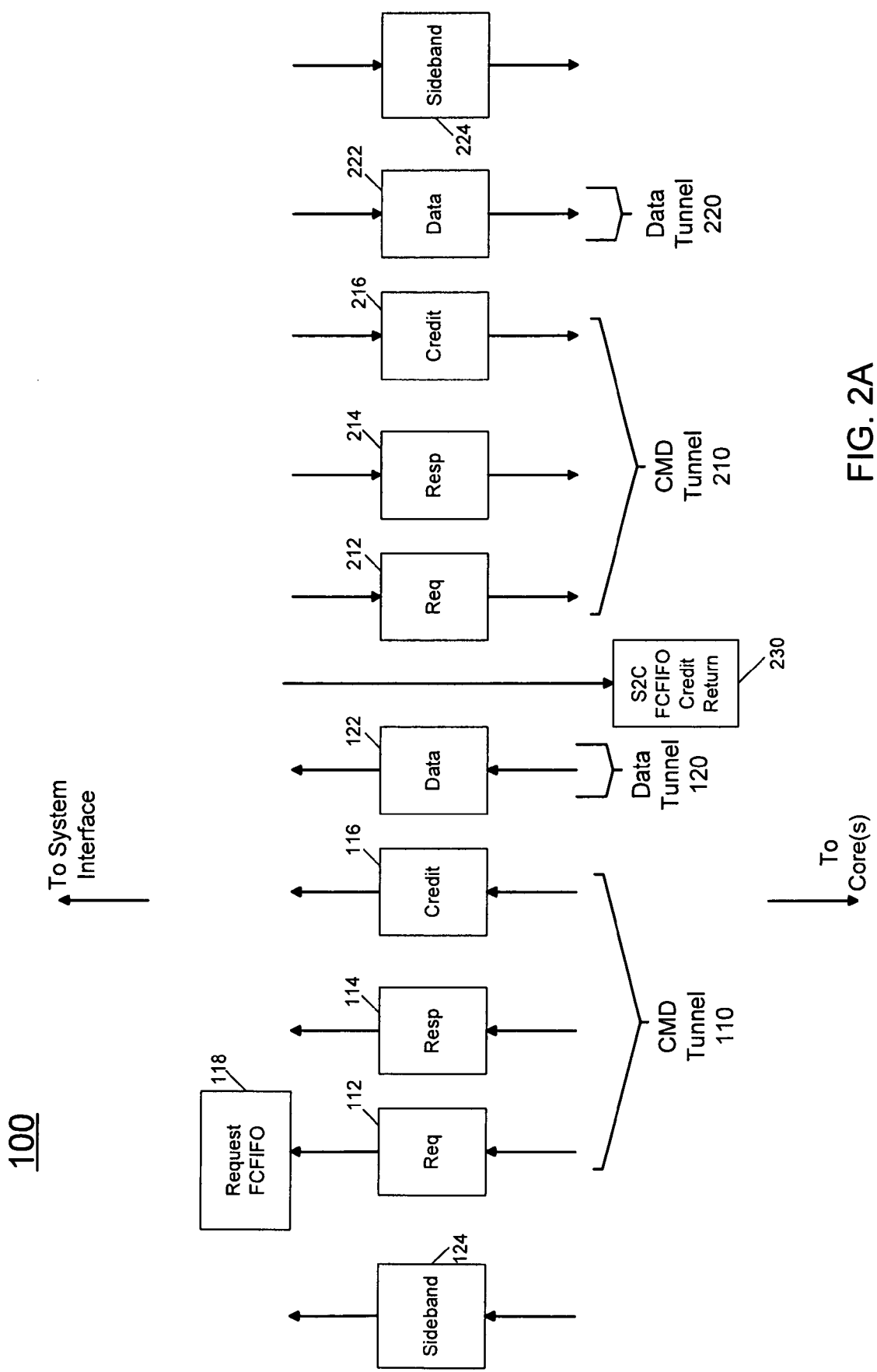
FIG. 2A is a block diagram of a plurality of channels configured into tunnels in accordance with an embodiment of the present invention.

To enable domain crossing, the link layers of the various components may include BGFs, as discussed above. In addition, the system interface may include additional BGFs to couple to other components such as memory controller and off-chip interconnect. BGFs may be arranged into tunnels, also discussed above. Referring now to FIG. 2A, shown is a block diagram of a plurality of channels configured into tunnels in accordance with an embodiment of the present invention. As shown in FIG. 2A, a link layer 100 may include multiple channels in each direction between the cores and system interface. For ease of discussion, communication from the cores to the system interface may be denoted with the short-hand "C2S", and in communications in reverse from the system interface to cores may be denoted with the short-hand "S2C". As shown in the implementation of FIG. 2A at least three tunnels may be provided in each direction, including command tunnels 110 and 210 and data tunnels 120 and 220. As shown, the command tunnels may include a request channel, a response channel and a credit channel, while the data tunnels include only a data related channel. To enable the domain crossing, BGFs in accordance with an embodiment of the present invention may be provided for each of the channels. As shown in FIG. 2A, command tunnel 110 includes BGFs 112-116, while data tunnel 120 includes BGF 122. As further shown in FIG. 2A, command tunnel 210 includes BGFs 212-216, and data tunnel 220 includes BGF 222. In some embodiments, sidebands may have one or more tunnels to jump domains together in the same unique frequencies.

In one embodiment, to write into a BGF, a BGF credit is needed. BGFs may implement write-ahead, meaning the writer can write a BGF at its own clock rate, until the BGF credits run out. A writer may either observe bubbles and choose to write only when bubbles are not present, or it may use write-ahead on every sender clock up to the number of BGF write credits available. BGF credits may be "implicit," meaning that a credit indicates that the FIFO has an open entry, but does not indicate which one. In the embodiment of FIG. 2A, the request, response and credit channels are linked in each direction. These linked channels thus create command (CMD) tunnel 110. Linking the request, response and credit channels means that if only one of the channels is written, the slot for the BGF is advanced anyway, so write-ahead credits are consumed, in one embodiment. Neither the core nor the system interface will attempt to bundle together the messages on the channels that go into a tunnel.

As described above, data channels 120 and 220 may have their own BGFs 122 and 222 in each direction, each creating a separate tunnel. In some embodiments, miscellaneous signals that need to run at speed between the core and system interface may be given payload-less BGFs. For example, a flow control FIFO 230 is used to return request flow control FIFO credits to the core. In some embodiments, another flow control FIFO (not shown in FIG. 2A) can be used to return data flow control FIFO credits to the core. Sideband information uses a serial interface BGF 124 and other mechanisms. The sideband channels may use serial packing to enable extensibility. In one embodiment, up to 32 low signal rate bits can be packed on a single wire, and be transported over corresponding BGFs 124 and 224.

Additional structures of the domain crossing logic may include a request flow control FIFO (FCFIFO) 118, which may be connected to the C2S request channel outputs of command tunnel 110 to hold requests pending to the LLC pipeline. This FIFO allows the system interface to flow control requests between different cores. A core consumes a request flow control FIFO credit to write any request into the C2S request channel. Each request message consumes exactly one flow control FIFO credit. The system interface, upon receiving a request from the core has a guaranteed buffer to hold the request, and now effectively owns the credit. The system interface will send credits for the request FCFIFO to the core on a dedicated return tunnel through BGF 230. In some implementations, a data FCFIFO (not shown in FIG. 2A) provides flow control for C2S data messages. From the IDI perspective, the FCFIFOs are link layer structures.

Different message types can be sent on the various channels. As examples, the core-to-system interface request channel carries core-initiated messages. In addition to standard information sent with requests (address, size, etc.), the request message may contain a core or thread tracker identifier (ID). This core tracker ID is what the system interface will send back with its response and data messages. The core-to-system interface response channel carries both snoop responses and advanced programmable interface controller (APIC) write completions. The core-to-system interface credit channel returns protocol credits for core snoop and other credits.

In one embodiment, the core-to-system interface data channel link layer is 16 bytes wide and carries partial write data, explicit writeback data (evictions, here the request channel will carry the address, etc.), and implicit writeback data (from snoops. Here the address is already known by the system interface and the data is sent back with a destination ID that allows the system interface to associate this data with a snoop). In one embodiment, the data channel sends full 64 bytes, as four clocks worth of link layer payload, even for a 1 byte data write. Byte valids are specified in the interface, and will insure only the correct data is consumed. In turn, the system interface-to-core request channel carries the system interface's snoop and other requests. The system interface-to-core response channel carry various cache miss and other system interface response messages. The system interface-to-core credit channel carries the read and write tracker protocol layer credits back to the core.

In one embodiment, the system interface-to-core data channel link layer is 32 bytes wide and carries read return data for requests made by the core, as well as interrupt vector information. The data comes with the original request's core or thread tracker ID, which associates the returning data with the core's request. Data return messages for a given transaction can be interleaved with data returns from other transactions.

Before requests can be sent along the IDI, appropriate credits need to be allocated. In this way, the interface does not have fails and re-tries. Implicit credits can be maintained on the sending side as a counter such that if the counter is non-zero, a message can be sent and the counter decremented, or explicit credits with actual entryID may be implemented. In some implementations, two levels of credits, link and protocol credits, may be used. Link credits are used to traverse the link and may include BGF and flow control FIFO credits. In turn, protocol credits are credits for one of the IDI protocol layer resource pools. For example, a core may communicate with a read tracker and write tracker pools, respectively. The system interface communicates with various core resource pools such as a core snoop queue, among other buffers.

Figure 2B:
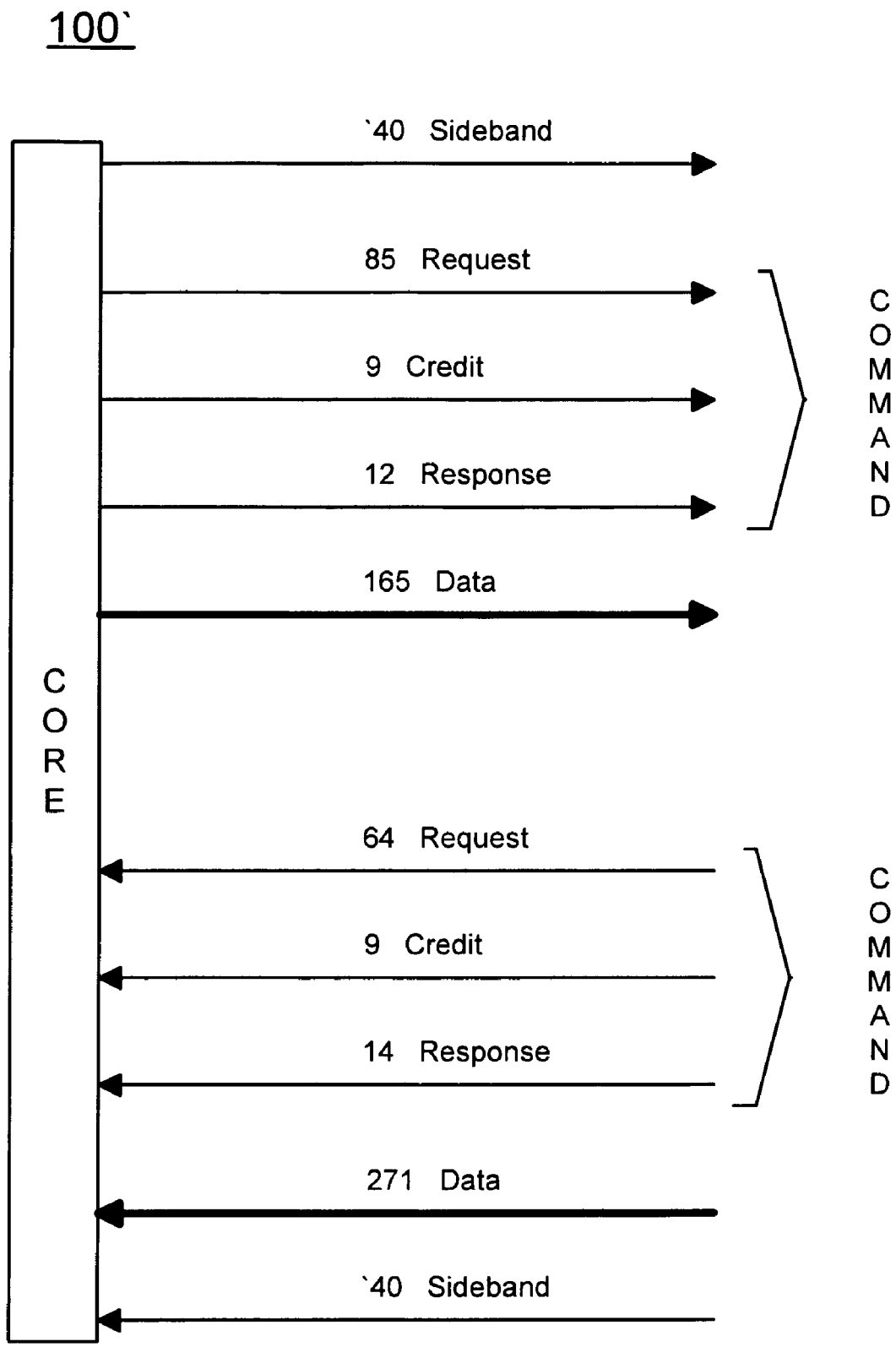
FIG. 2B is a block diagram of an in-die interconnect (IDI) coupled to a core in accordance with one embodiment of the present invention.

While various implementations may have different amounts of channels and tunnels, and corresponding differing amounts of link layer widths to enable data communication, FIG. 2B shows a block diagram of an IDI link 100' coupled to a core 20. As shown in the embodiment of FIG. 2B, IDI 100' may include command tunnels, data tunnels and sideband tunnels in both directions. As seen, varying amounts of wires may be present in each channel's link layer implementation. In one implementation IDI 100' may have a native width of 180 bits for the command tunnels and 180 bits for a 16-byte data tunnel, although the scope of the present invention is not limited in this regard. Note further with regard to the sideband channels, that in addition to a single serial wire to enable communication of multiple sideband signals packed on this single wire, additional wires may be present for other sideband signal information such as design for test (DFT) information and other sideband signals.

Figure 3:
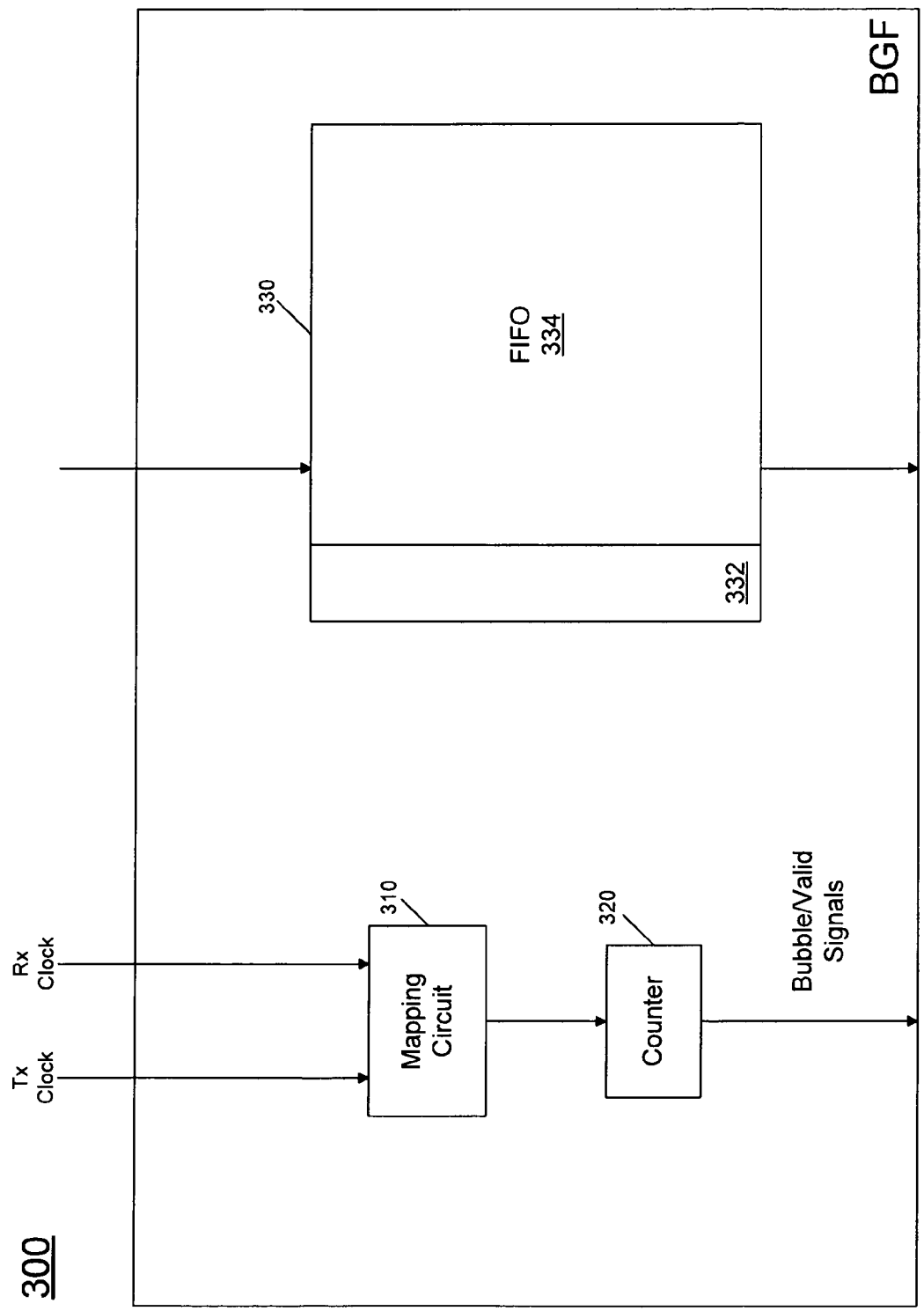
FIG. 3 is a block diagram of a bubble generator circuit in accordance with one embodiment of the present invention.

Referring now to FIG. 3, shown is a block diagram of a bubble generator FIFO in accordance with one embodiment of the present invention. As shown in FIG. 3, BGF 300 may be configured to enable communication of information between agents on a die operating in different clock/power domains. This operation may occur in a deterministic manner to identify the allowed clock transitions at which data can be written/read as a source-synchronous or fully-synchronous communication scheme is present, which may have valuable manufacturing/testability/bug reproducibility attributes, whereas asynchronous communication is not deterministic. In source-synchronous or fully synchronous communication, the various domains are all based on same or differing ratios of a single base oscillator frequency. For example, a 100 Megahertz (MHz) system clock may be the basis upon which all IDI components operate. For example, assume four IDI connected components want to intercommunicate with an on-die system agent running at ratio S, where the components are at ratios N, M, P, Q multipliers of the base frequency. S, N, M, P and Q might be any integer 1-64 as an example. The communication is not asynchronous because all components use a same base oscillator (e.g., 100 MHz) to generate all S,N,M,P,Q variants. The S,N,M,P,Q variants may have great skew and phase differences to one another, but they "track" one another source-synchronously rather than asynchronously because all variants are generated by PLL's using the same "source" base frequency.

As shown, BGF 300 includes a mapping circuit 310 that is coupled to receive clock ratio signals (not clocks) for both sender (TXCLK) and receiver (RXCLK). In this way, mapping circuit 310 generates a map of which local domain clock edges an agent is allowed to read from BGF 300. This is effected using mapping circuit 310 in connection with a counter 320, which acts to track the legal clock edges for transfer in each domain. In one embodiment, counter 320 generates a bubble/valid signal that is provided to the receiver. The bubble/valid signal is a repeating pattern that is generated once per base clock frame.

By using mapping circuit 310 and counter 320, valid signals will be generated when the receiver is allowed to safely read information from the BGF, while a bubble signal indicates that the receiver should not read from the BGF. More specifically, BGF 300 includes a FIFO queue 330 including a plurality of entries each including a valid field 332 and a data field 334. Entries are written into FIFO 330 from the sender and stored in FIFO 330 until the receiver reads the entry according to the valid signal generated. Note that the bubble signals can be spread evenly throughout the base clock frame. In one implementation, of two agents operating at different clock domains, the slower agent may always read at its full rate, which may be at a clock rate defined to be the interface link clock rate.

Figure 4:
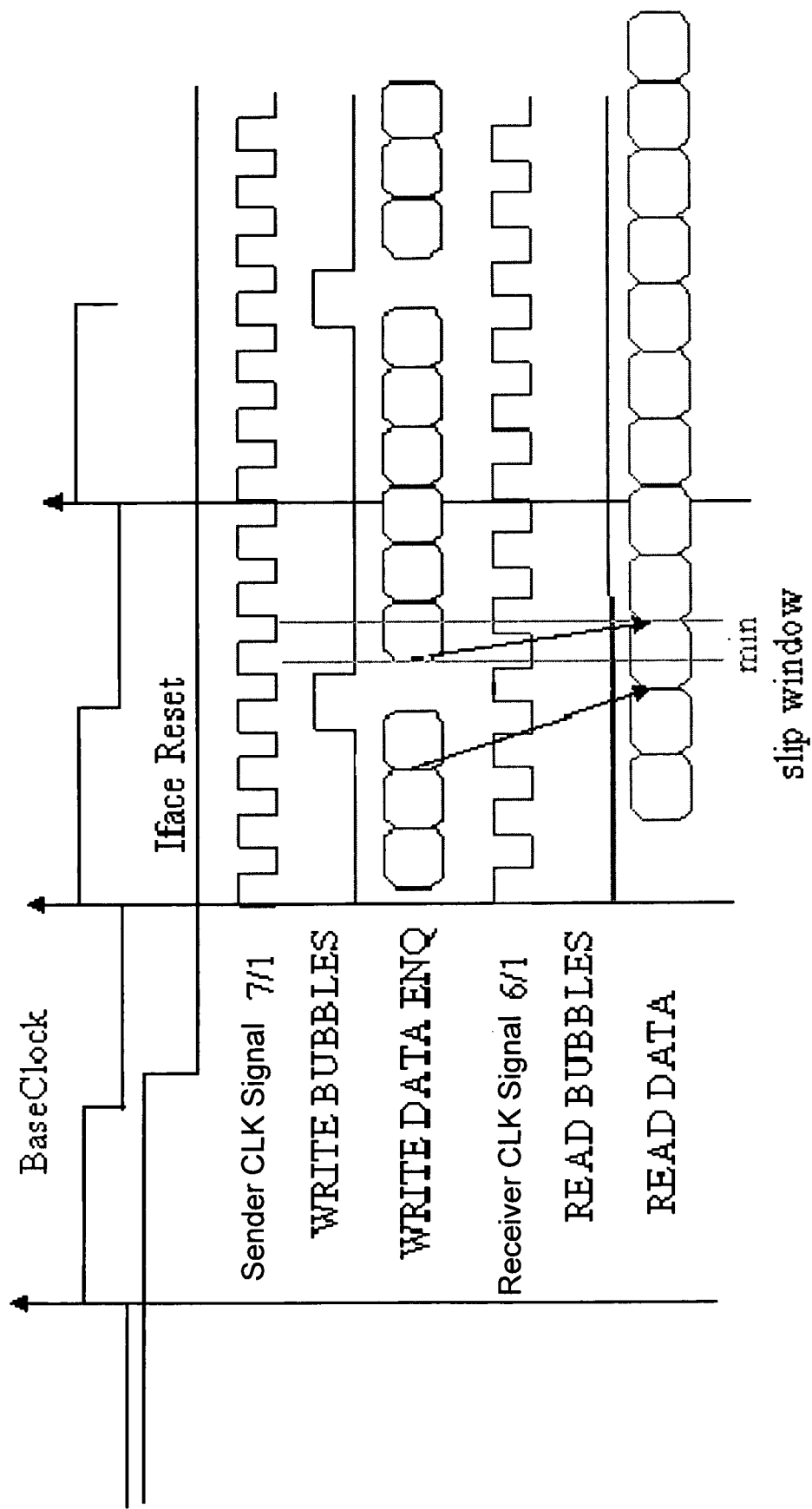
FIG. 4 is a timing diagram of operation of a bubble generator circuit in accordance with one embodiment of the present invention.

Referring now to FIG. 4, shown is a timing diagram of operation of a bubble generator FIFO in accordance with one embodiment of the present invention. In FIG. 4, an example is provided where a sender has a ratio of 7:1 with respect to a base clock and a receiver has a ratio 6:1 with respect to the base clock. Thus a 7:6 ratio of sender-to-receiver exists with approximately one clock of skew tolerance slip in the example. As seen, because the sender writes at a higher clock rate, a write bubble signal is generated such that no data is written by the sender during its corresponding clock signal while the write bubble signal is active. Similarly, read bubbles may be generated to prevent reading of data during a clock signal of a reader when the read bubble signal is active to provide the skew tolerance "slip" necessary to ensure data has settled in the BGF FIFO before a receiver looks at it in its clock domain. As shown in the implementation of FIG. 4, however, because the reader is operating at a lower clock frequency, no read bubbles are present. As further shown in FIG. 4, a slip window is provided to enable the smooth reading of data through the BGF in the presence of the different clock domains at which sender and receiver operate.

As another example, assume that a processor core has a ratio of 34:1 and a system interface has a ratio of 30:1 (both with regard to the base clock rate). In a direction of data flow from system interface to processor core, the core will have four clocks per base frame in which the core is unable to read from the BGF. In contrast, in the direction from core to system interface, because the system interface is operating at the slower clock rate, it reads from the BGF at its full clock rate, i.e., every clock edge of its clock per base frame.

Figure 5:
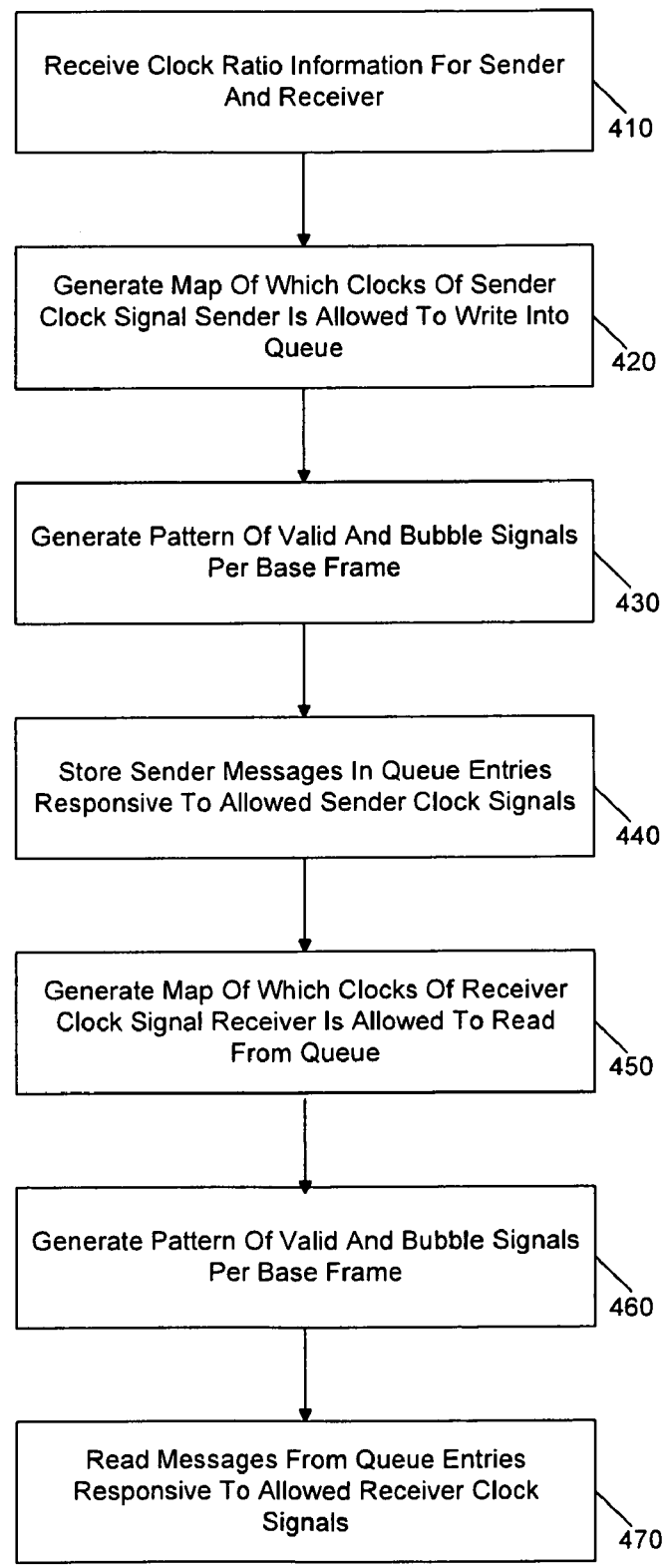
FIG. 5 is a flow diagram of a method in accordance with one embodiment of the present invention.

Referring now to FIG. 5, shown is a flow diagram of a method in accordance with one embodiment of the present invention. As shown in FIG. 5, method 400 may be used to control communications between different domains of a chip using a BGF in accordance with an embodiment of the present invention. As shown in FIG. 5, method 400 may begin by receiving clock ratio information for a sender and receiver. As one example, this clock ratio information may be ratios between clock signals for the sender (and receiver) and the on-die interconnect, which may correspond to a base frame rate. While described in connection with ratios, in other embodiments the information may simply be in the form of the clock signals for the sender and receiver. In this way, only the ratio information of both parties is needed in each domain, not the clocks of both parties (as mixing clocks can be difficult). Mixing of the actual clocks between domains does not occur with IDI because clock crossing is resolved in the "abyss" created by the slip window inside the BGF's, where the abyss is a separation of points in time between when a sender writes. and a receiver reads. the BGF. That separation is created by knowing each other's ratios to the common base clock speed, some "start" pulses that create the initial write and read pointer separation each time the tunnel is initiated, and the endless treadmill of "bubbles" for each base clock frame calculated by knowing each other's ratios.

Next at block 420, a mapping may be generated that indicates which clocks of the sender clock signal that the sender is allowed to write into a queue of the BGF (block 420). Based on this mapping, a pattern of valid and bubble signals may be generated per base frame (block 430). These signals may thus be provided to the sender to enable the storage of messages from the sender into queue entries responsive to the allowed sender clock signals (block 440). In some embodiments, writing into the BGF can be done without using mapping and valids/bubbles, and instead by using the sender clock, assuming sufficient credits, i.e., write-ahead operation.

In addition to controlling writing of data into the queue according to valid and bubble signals, similar such valid and bubble signals can be used to control reading of data by the receiver. More specifically, as shown in FIG. 5 at block 450 a mapping may be generated that indicates which clocks of the receiver clock signal that the receiver is allowed to read from the BGF queue. Based on this mapping, a pattern of valid and bubble signals may be generated per base frame (block 460). These signals may thus be provided to the receiver to enable reading of messages stored in queue entries responsive to the allowed receiver clock signals (block 470). While shown with this particular implementation in the embodiment of FIG. 5, the scope of the present invention is not limited in this regard.

Figure 6:
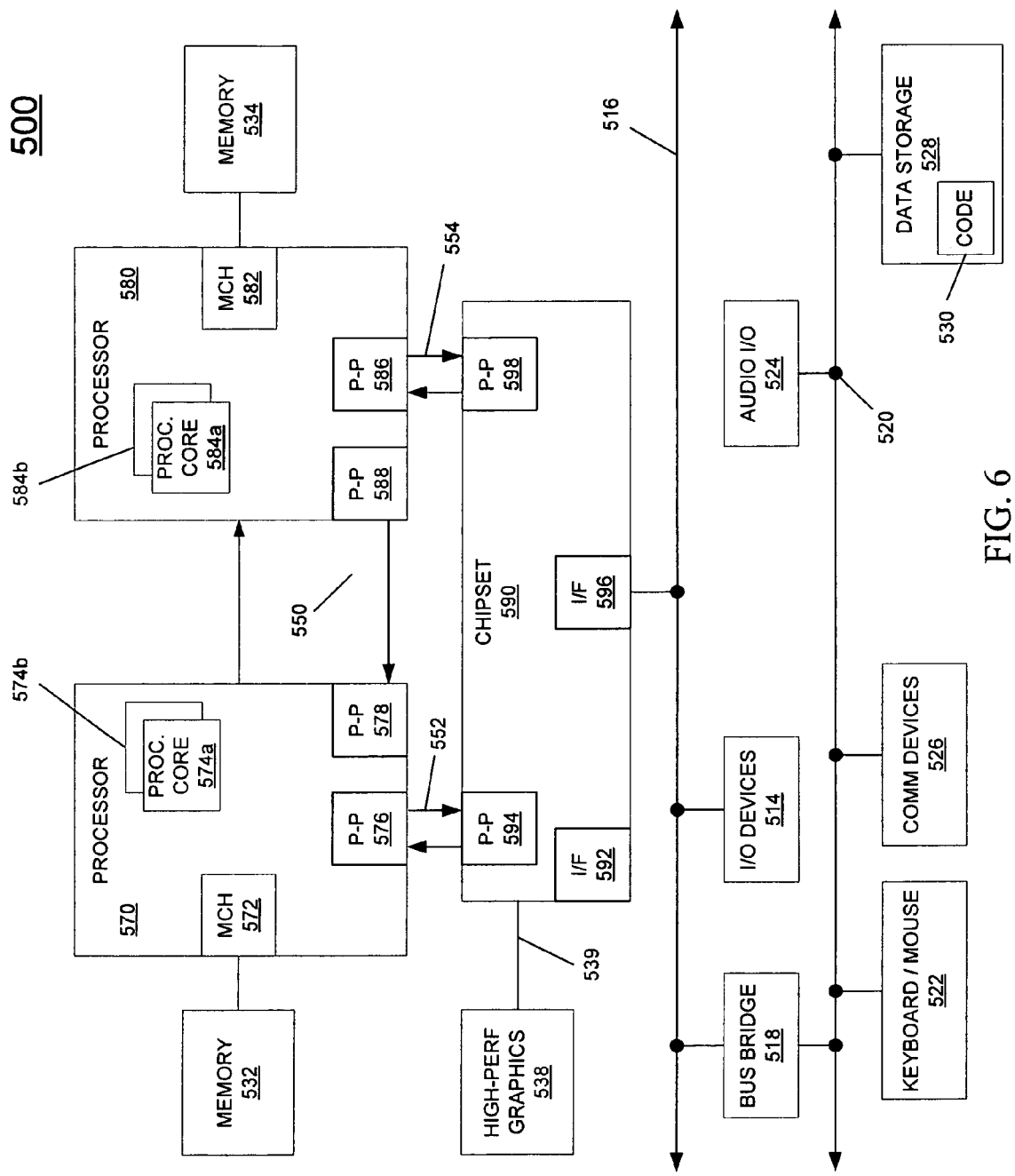
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b).

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 6, chipset 590 includes P-P interfaces 594 and 598. Note that various interconnects shown in FIG. 6 may be IDIs to enable communication between different voltage/frequency domains in accordance with an embodiment of the present invention.

Furthermore, chipset 590 includes an interface 592 to couple chipset 590 with a high performance graphics engine 538. In turn, chipset 590 may be coupled to a first bus 516 via an interface 596. As shown in FIG. 6, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a queue to store a plurality of entries, each entry to store information written by a sender that operates at a first clock domain and to be read by a receiver that operates at a second clock domain;
    a mapping circuit to receive a first clock ratio signal of the sender and a second clock ratio signal of the receiver and to map at which second clock signals of the receiver within a base frame that the receiver is allowed to read a queue entry; and
    a counter coupled to the mapping circuit to generate a bubble signal when the receiver is not allowed to read the queue entry and to generate a second bubble signal when the sender is not allowed to write to the queue entry, wherein the counter is to track legal clock edges for transfer in at least the second clock domain.

2. The apparatus of claim 1, wherein the apparatus comprises a bubble generator circuit coupled between the sender and the receiver.

3. The apparatus of claim 2, wherein the bubble generator circuit is associated with a channel of an in-die interconnect (IDI) along which a first message type is communicated between the sender and the receiver.

4. The apparatus of claim 3, further comprising a plurality of bubble generator circuits each associated with a channel of the IDI that is to communicate a different message type.

5. The apparatus of claim 4, wherein a first bubble generator circuit is associated with a sideband channel in which a plurality of sideband signals are communicated serially.

6. The apparatus of claim 3, wherein the first clock ratio signal comprises a ratio between a first clock of the sender and an interface clock of the IDI, and the second clock ratio signal corresponds to a second ratio between the second clock of the receiver and the interface clock.

7. The apparatus of claim 1, wherein the counter is to generate a repeating pattern of at least one bubble signal and at least one valid signal per base frame.

8. A method comprising:
    writing data from a writer coupled to a reader via an in-die interconnect (IDI) into a first entry of a queue of a first channel of the IDI according to a first clock ratio of the writer that operates in a first clock domain and at a first voltage;
    generating a mapping of which second clock signals of the reader that the reader is allowed to read from the queue, based on the first clock ratio, a second clock ratio of the reader and a base frame of the IDI, wherein the reader operates in a second clock domain and at a second voltage; and
    reading the data from the first entry by the reader at an allowed one of the second clock signals.

9. The method of claim 8, further comprising generating the mapping via a mapping circuit that receives the first clock ratio of the writer and the second clock ratio of the reader.

10. The method of claim 9, further comprising generating a bubble signal when the reader is not allowed to read from the queue, responsive to a counter coupled to the mapping circuit, wherein the counter is to track legal clock edges for transfer in the second clock domain.

11. The method of claim 8, further comprising transmitting a plurality of low rate signals from the writer to the reader via a second channel of the IDI, wherein the plurality of low rate signals are serialized along the second channel.

12. The method of claim 11, further comprising transmitting the plurality of low rate signals in a second tunnel of the IDI, wherein the first channel is of a first tunnel of the IDI.

13. A system comprising:
    a processor including:
        an intellectual property (IP) block to execute instructions and operate at a first clock domain and a first voltage, the IP block including a link layer having a bubble generator circuit including:
            a queue to store a plurality of entries, each entry to store information written by the IP block and to be read by a system interface of the processor that is to operate at a second clock domain, wherein the IP block is to consume a credit to write to an entry in the queue;
            a mapping circuit to receive a first clock ratio of the first clock domain and a second clock ratio of the second clock domain and to determine at which second clock signals of a base frame that the system interface is allowed to read a queue entry; and
            a counter coupled to the mapping circuit to track legal clock edges for transfer in at least the second clock domain;
        an in-die interconnect (IDI) coupled between the IP block and the system interface and including a plurality of tunnels each having at least one channel to communicate information between the IP block and the system interface; and
        the system interface coupled to the IDI to communicate with at least one system component coupled to the processor, wherein the system interface is to operate at a second voltage; and
    a dynamic random access memory (DRAM) coupled to the processor via a second interconnect.

14. The system of claim 13, wherein the counter is to generate a repeating pattern of at least one bubble signal and at least one valid signal per base frame, wherein the system interface is not allowed to read from the queue when the bubble signal is active.

15. The system of claim 13, wherein the IP block is to receive a credit via a first channel of a first tunnel when the system interface reads an entry from the queue.

16. The system of claim 13, wherein the processor includes a plurality of IP blocks coupled to the IDI, each including a link layer with at least one bubble generator circuit, wherein a first one of the plurality of IP blocks comprises a processor core and a second one of the plurality of IP blocks comprises a graphics processor.

17. The system of claim 16, wherein the system interface includes a link layer having a first bubble generator circuit and a second queue coupled to the first bubble generator circuit to store requests from the plurality of IP blocks and provide the requests to a shared cache of the system interface.

18. The system of claim 17, wherein the system interface further includes: a second bubble generator circuit to couple the system interface to a memory controller of the system interface; and a third bubble generator circuit to couple the system interface to an off-chip interconnect.

* * * * *